(12) United States Patent
Iwamoto

(10) Patent No.: US 10,237,469 B2
(45) Date of Patent: Mar. 19, 2019

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Yasuhiko Iwamoto, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/625,067

(22) Filed: Jun. 16, 2017

(65) Prior Publication Data

US 2017/0366738 A1    Dec. 21, 2017

(30) Foreign Application Priority Data

Jun. 17, 2016   (JP) ................................ 2016-120794

(51) Int. Cl.
*H04N 5/232*   (2006.01)

(52) U.S. Cl.
CPC ..... *H04N 5/23212* (2013.01); *H04N 5/23229* (2013.01)

(58) Field of Classification Search
None
See application file for complete search history.

(56) References Cited

U.S. PATENT DOCUMENTS

| | | | |
|---|---|---|---|
| 2014/0218595 A1* | 8/2014 | Kanda | H04N 5/23212 348/353 |
| 2014/0232927 A1* | 8/2014 | Kawai | G02B 7/36 348/347 |

FOREIGN PATENT DOCUMENTS

JP    2012-33143 A    2/2012

* cited by examiner

*Primary Examiner* — Mark T Monk

(74) *Attorney, Agent, or Firm* — Canon U.S.A., Inc. IP Division

(57) ABSTRACT

There is provided an information processing apparatus capable of determining an object area with high accuracy. An object area determination unit of the information processing apparatus acquires defocus information of positions in a captured image and information of a position specified as an object in the captured image, and determines, based on a difference between a defocus value at each of the positions and a defocus value at the specified position, an estimated area of the object specified in the captured image. Further, the object area determination unit determines an object area from the captured image based on an evaluation value calculated from each of a plurality of evaluation areas set for the specified position.

28 Claims, 12 Drawing Sheets

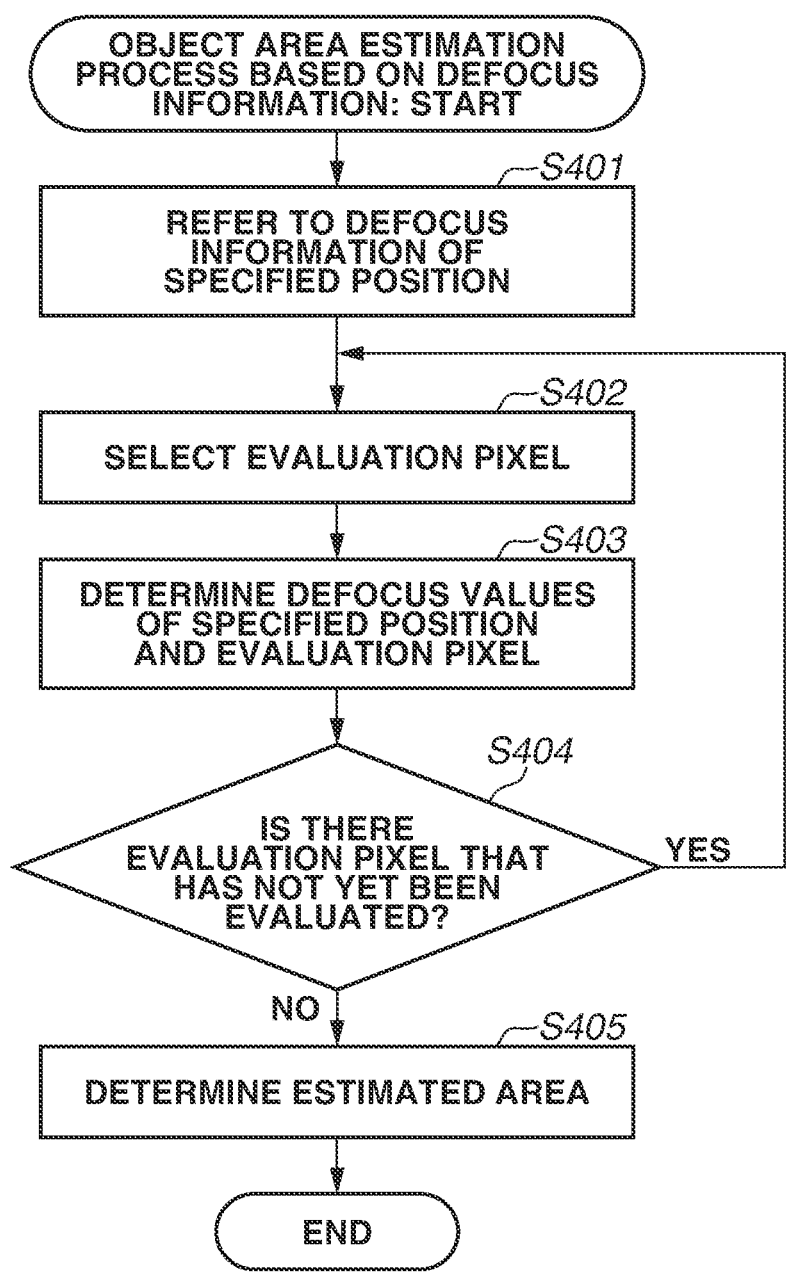

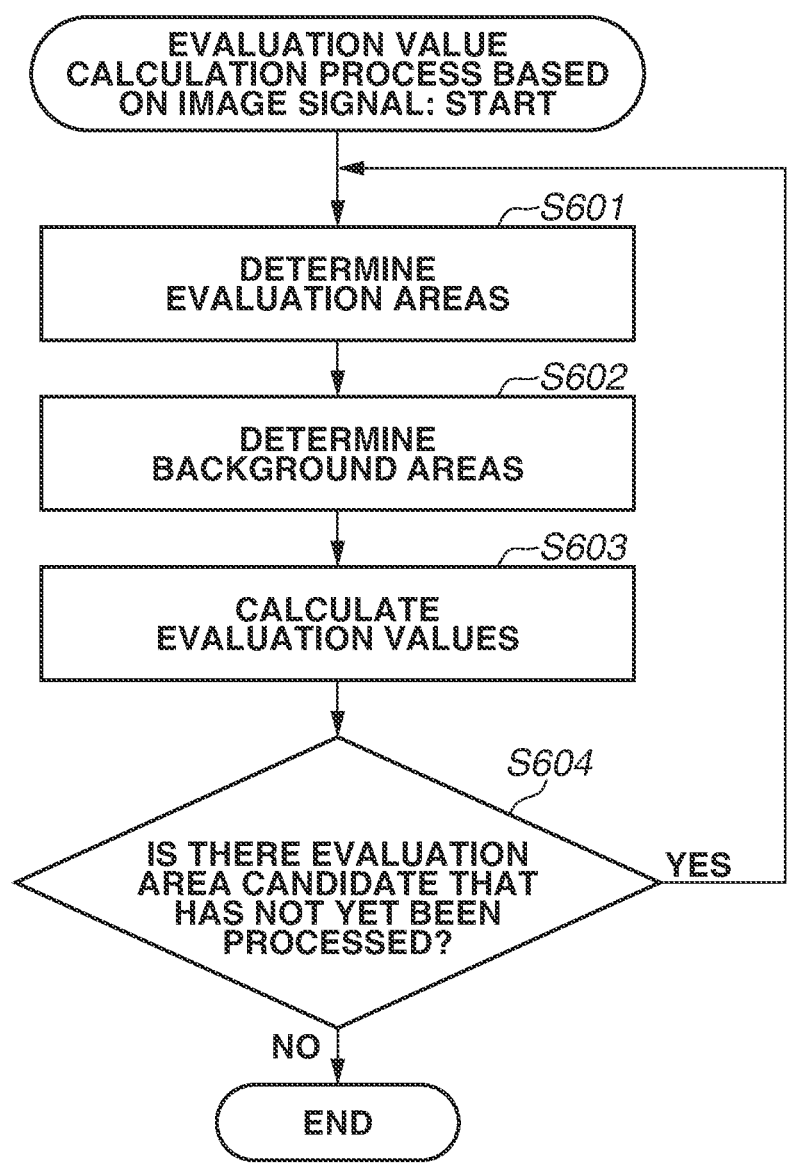

INFORMATION PROCESSING APPARATUS, INFORMATION PROCESSING METHOD, AND STORAGE MEDIUM

BACKGROUND

Field of the Disclosure

The present disclosure relates to an information processing apparatus for determining an image area of an object from a captured image, an information processing method, an imaging apparatus, and a storage medium.

Description of the Related Art

Conventionally, various methods for, in a case where the position of an object is specified on an image by some method, determining an image area of the object (hereinafter referred to as an "object area") based on an image signal near the specified position have been discussed. For example, Japanese Patent Application Laid-Open No. 2012-33143 discusses a technique of extracting a target area from an input video image, further extracting a background area taking into account the size of the target area, and determining a target (an object area) based on the histograms of the target area and the background area.

In the case of the technique discussed in Japanese Patent Application Laid-Open No. 2012-33143, however, under the condition that image signals of the object area (the target) and the background area resemble each other, the object area may not be correctly determined as the target. It is considered that this is because the technique of Japanese Patent Application Laid-Open No. 2012-33143 is based on the premise that the histograms of the target area and the background area are different from each other. More specifically, in a case where the image signals of the object area and the background area resemble each other, the difference between the histograms of the object area and the background area is small. As a result, even if the target area correctly captures the object area, it cannot be determined whether the target area is the target (the object area). For this reason, even under various conditions including the condition that image signals of an object area and a background area resemble each other, it is desired to determine the object area with high accuracy.

SUMMARY

According to an aspect of the present disclosure, an information processing apparatus includes a determination circuit configured to acquire defocus values at positions in a captured image, acquire a position specified as an object in the captured image, determine, based on a difference between a defocus value at each of the positions and a defocus value at the specified position, an estimated area of the object specified in the captured image, and determine an object area from the captured image based on an evaluation value calculated from each of a plurality of evaluation areas set for the specified position, wherein the determination circuit uses an evaluation area contained in the estimated area.

Further features of the present disclosure will become apparent from the following description of exemplary embodiments with reference to the attached drawings.

BRIEF DESCRIPTION OF THE DRAWINGS

FIG. 4 is a detailed flowchart of an object area estimation process according to one or more aspects of the present disclosure.

FIG. 6 is a detailed flowchart of an evaluation value calculation process according to one or more aspects of the present disclosure.

DESCRIPTION OF THE EMBODIMENTS

With reference to the attached drawings, exemplary embodiments of the present disclosure will be described below.

Figure 1:
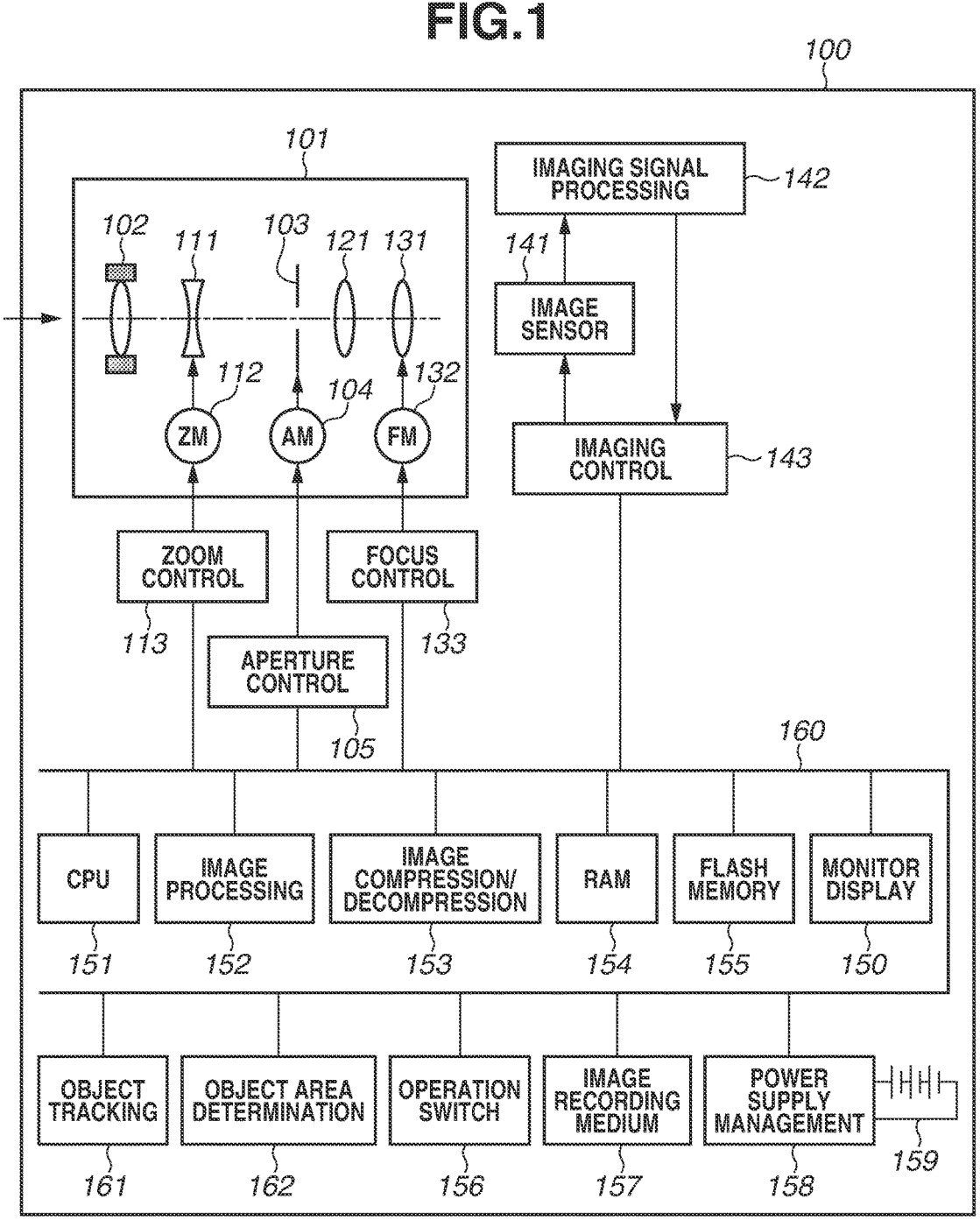
FIG. 1 is a diagram illustrating a general configuration of an imaging apparatus according to one or more aspects of the present disclosure.

With reference to FIG. 1, a description is given of the general configuration of an imaging apparatus 100, to which an information processing apparatus according to a first exemplary embodiment is applied. The imaging apparatus 100 according to the present exemplary embodiment is applicable to a digital still camera and a video camera that are capable of capturing an object and recording data of a moving image and a still image in various recording media such as a magnetic tape, a solid-state memory, an optical disc, and a magnetic disk. Additionally, the imaging apparatus 100 according to the present exemplary embodiment is also applicable to cameras provided in various mobile terminals such as a smartphone and a tablet terminal, an industrial camera, an in-car camera, and a medical camera.

Although the details will be described below, the imaging apparatus 100 according to the present exemplary embodiment has an object tracking function of extracting an image area of a particular object (an object area) from images successively supplied in a time-series manner and tracking the object area. Further, although the details will be described below, when tracking a particular object area, the imaging apparatus 100 according to the present exemplary embodiment uses, for an object area estimation process, defocus information that can be calculated from parallax images.

Units in the imaging apparatus 100 according to the present exemplary embodiment are connected with each other via a bus 160. The units are controlled by a central processing unit (CPU) 151. A lens unit 101 of the imaging apparatus 100 includes a fixed first-group lens 102, a zoom lens 111, a diaphragm 103, a fixed third-group lens 121, and a focus lens 131. According to an instruction from the CPU 151, an aperture control circuit 105 drives the diaphragm 103 via an aperture motor 104 (AM), thereby adjusting the aperture diameter of the diaphragm 103 to adjust the amount of light when an image is captured. A zoom control circuit 113 drives the zoom lens 111 via a zoom motor 112 (ZM), thereby changing the focal length. Based on the amount of shift in the focus direction of the lens unit 101, a focus control circuit 133 determines a driving amount for driving a focus motor 132 (FM) and drives the focus lens 131 via the focus motor 132 based on the driving amount, thereby adjusting the focus. As described above, based on the amount of shift in the focus direction of the lens unit 101, the focus control circuit 133 controls the movement of the focus lens 131 via the focus motor 132, thereby performing autofocus (AF) control. The focus lens 131 is a lens for adjusting the focus and is illustrated in a simplified manner as a single lens in FIG. 1. However, the focus lens 131 generally includes a plurality of lenses. The lens unit 101 having such a configuration forms an optical image of an object or the background on the imaging plane of an image sensor 141.

The image sensor 141 photoelectrically converts the optical image of the object or the background formed on the imaging plane into an electric signal. An imaging operation of the image sensor 141 is controlled by an imaging control circuit 143. Although the details will be described below, the image sensor 141 is configured in such a manner that a plurality of pixels, each capable of generating parallax images using two photoelectric conversion elements (first and second photoelectric conversion elements in the present exemplary embodiment) sharing a single microlens, is arranged. More specifically, in the image sensor 141, the first and second photoelectric conversion elements (light-receiving areas) are placed in each of m×n pixels, m pixels being arranged in a horizontal direction and n pixels being arranged in a vertical direction. The image signal obtained by photoelectrically converting the image formed on the imaging plane of the image sensor 141 is sent to an imaging signal processing circuit 142.

The imaging signal processing circuit 142 adds the outputs from the first and second photoelectric conversion elements of each pixel, thereby acquiring an image signal (captured image data) corresponding to the optical image formed on the imaging plane. Further, the imaging signal processing circuit 142 separately handles the outputs from the first and second photoelectric conversion elements of each pixel, thereby acquiring signals of two images having parallax (parallax images). In the description of the present exemplary embodiment, an image obtained by adding the outputs from the first and second photoelectric conversion elements of each pixel is referred to as an "A+B image", and parallax images obtained by separately handling the outputs from the two photoelectric conversion elements of each pixel are referred to as an "A-image" and a "B-image". In the image sensor 141 according to the present exemplary embodiment, the first and second photoelectric conversion elements are arranged side by side in the horizontal direction. Thus, the A-image and the B-image are images having parallax in the horizontal direction. Captured image data of the A+B image and parallax image data of the A-image and the B-image output from the imaging signal processing circuit 142 are sent to a random-access memory (RAM) 154 via the imaging control circuit 143 and temporarily accumulated in the RAM 154. For example, in a case where the imaging apparatus 100 captures a moving image or captures continuous still images at regular time intervals, the captured image data of the A+B image and the parallax image data of the A-image and the B-image are sequentially output from the imaging signal processing circuit 142 to the RAM 154 and accumulated in the RAM 154.

Of the image data accumulated in the RAM 154, the captured image data of the A+B image is sent to an image processing circuit 152. The image processing circuit 152 performs various types of image processing such as gamma correction and a white balance process on the captured image data read from the RAM 154. Further, the image processing circuit 152 also performs, for example, the process of reducing or enlarging the processed image data to a size optimal for the display of the image data on a monitor display 150. The image data reduced or enlarged to the optimal size by the above process is sent to the monitor display 150 and displayed as a preview image or a through image on the monitor display 150. An operator (hereinafter referred to as a "user") of the imaging apparatus 100 can observe the captured image in real time by viewing the display image on the monitor display 150. In a case where the imaging apparatus 100 according to the present exemplary embodiment is set to, immediately after capturing an image, display the captured image on a screen of the monitor display 150 for a predetermined time, then immediately after an image is captured, the user can confirm the captured image. Further, the captured image data of the A+B image accumulated in the RAM 154 is also sent to an image compression/decompression circuit 153. The image compression/decompression circuit 153 compresses the captured image data read from the RAM 154 and then sends the compressed image data to an image recording medium 157 serving as a recording medium. The image recording medium 157 records the compressed image data.

Further, as a generation unit according to the present exemplary embodiment, the imaging control circuit 143 generates defocus information from the parallax image data of the A-image and the B-image and sends the defocus information to the focus control circuit 133. Based on the defocus information, the focus control circuit 133 drives the focus lens 131 via the focus motor 132, thereby performing AF control. The defocus information is, for example, information indicating the amount of shift in the optical axis direction relative to the state where an object is in focus. Thus, the focus control circuit 133 performs AF control to eliminate the shift in the optical axis direction. Although the details will be described below, in the imaging apparatus 100 according to the present exemplary embodiment, the defocus information calculated by the imaging control circuit 143 is temporarily accumulated in the RAM 154 and also used for an object area estimation process performed by an object area determination circuit 162.

An operation switch 156 is an input interface including a touch panel and various buttons and switches. The buttons and the switches are provided in a housing of the imaging apparatus 100, and the touch panel is placed on a display surface of the monitor display 150. The imaging apparatus 100 according to the present exemplary embodiment can display various function icons on the screen of the monitor display 150. These various function icons are selected and operated by the user through the touch panel. Operation information input by the user through the operation switch 156 is sent to the CPU 151 via the bus 160.

If operation information is input by the user through the operation switch 156, the CPU 151 controls the units based on the operation information. Further, when the image sensor 141 captures an image, the CPU 151 determines the charge accumulation time of the image sensor 141 and the setting value of the gain of the output of image data from the image sensor 141 to the imaging signal processing circuit 142. Specifically, the CPU 151 determines the accumulation time of the image sensor 141 and the setting value of the output gain based on an instruction according to operation information input by the user through the operation switch 156 or the size of the pixel value of image data temporarily accumulated in the RAM 154. The imaging control circuit 143 receives indications of the accumulation time and the setting value of the gain from the CPU 151 and controls the image sensor 141 according to these indications.

A battery 159 is appropriately managed by a power supply management circuit 158 and stably supplies power to the entire imaging apparatus 100. A flash memory 155 stores a control program necessary for the operation of the imaging apparatus 100. If the imaging apparatus 100 starts (shifts from a power off state to a power on state) by an operation of the user, the control program stored in the flash memory 155 is read (loaded) into a part of the RAM 154. Consequently, the CPU 151 controls the operation of the imaging apparatus 100 according to the control program loaded into the RAM 154.

At this time, in the imaging apparatus 100 according to the present exemplary embodiment, the user can specify a desired object position by performing a touch operation or a button operation on the display screen of the monitor display 150 while viewing, for example, a through image displayed on the monitor display 150. A specifying unit according to the present exemplary embodiment corresponds to the operation switch 156, through which the touch operation or the button operation is performed on the display screen of the monitor display 150 by the user when specifying the desired object position. Then, if an object position is specified on an image plane on the monitor display 150 by a position specifying operation performed by the user in the imaging apparatus 100, the CPU 151 sends coordinate information of the specified position on the image plane to the object area determination circuit 162 and an object tracking circuit 161. Further, at this time, the CPU 151 sends the captured image data of the A+B image and the defocus information accumulated in the RAM 154 to the object area determination circuit 162 and further sends the captured image data of the A+B image to the object tracking circuit 161. In the following description, the captured image data of the A+B image to be input to the object area determination circuit 162 and the object tracking circuit 161 is referred to as "input image data".

The object area determination circuit 162 corresponds to the information processing apparatus according to the present exemplary embodiment. Based on the coordinate information of the specified position, the input image data of the A+B image, and the defocus information, the object area determination circuit 162 determines an area where an object image is present (an object area) in the input image of the A+B image. Although the details will be described below, first, based on the input image data of the A+B image, the defocus information, and the coordinate information of the specified position, the object area determination circuit 162 obtains an area estimated as the object area (hereinbelow referred to as an estimated area) in the captured image. Further, the object area determination circuit 162 sets a plurality of evaluation areas, calculates evaluation values for the respective evaluation areas (hereinbelow referred to as "area evaluation values"), and determines the object area based on the estimated area and the area evaluation values of the respective evaluation areas. Information of the object area determined by the object area determination circuit 162 is sent to the object tracking circuit 161, the CPU 151, the focus control circuit 133, the aperture control circuit 105, and the image processing circuit 152 via the bus 160.

For example, in a case where the user changes the specified position by touching another position on the display screen, then based on the changed specified position, the object area determination circuit 162 can also update the object area to be determined. Further, the object area determination circuit 162 treats as the specified position the position of a tracked object area sequentially tracked from input images of the A+B image by the object tracking circuit 161, and thereby can also update the object area to be determined next. As the position of the tracked object area, as an example, the center position or the position of the center-of-gravity of the tracked object area can be used.

The object tracking circuit 161 registers as a template image the object area determined by the object area determination circuit 162 based on the specified position. The object tracking circuit 161 performs a matching process between the template image and partial areas of input images of the A+B image sequentially supplied from the RAM 154, thereby obtaining matching evaluation values. Specifically, the object tracking circuit 161 sequentially sets partial areas in the input images of the A+B image by, for example, a raster process and performs a matching process between the sequentially set partial areas and the template image, thereby obtaining a plurality of matching evaluation values corresponding to the partial areas. Then, the object tracking circuit 161 sets as tracking candidates a plurality of partial areas corresponding to a plurality of top matching evaluation values among the plurality of matching evaluation values and sets as a tracked object area a partial area having the highest matching evaluation value among the tracking candidates. Although there are a wide variety of methods as a method for the matching process, the present exemplary embodiment uses, as an example, the technique of a template matching process based on the degree of difference in pixel pattern. A matching evaluation value in this case is defined such that the smaller the degree of difference, the higher the value. Based on the input images of the A+B image read from the RAM 154 and sequentially supplied in a chronological manner, the object tracking circuit 161 outputs information indicating the tracked object area tracked as described above. The information of the tracked object area output from the object tracking circuit 161 is sent to the CPU 151, the focus control circuit 133, the aperture control circuit 105, and the image processing circuit 152 via the bus 160.

Under the imaging condition that an object corresponding to the tracked object area from the object tracking circuit 161 is an AF control target, the focus control circuit 133 performs AF control to bring the object into focus. Further, using the luminance value of the tracked object area, the aperture control circuit 105 controls the exposure under the imaging condition that the brightness of the tracked object area is appropriate. Further, the image processing circuit 152 performs image processing so that the tracked object area is subjected to optimal gamma correction and an optimal white balance process. Further, the CPU 151 performs display control so that, for example, a rectangular image surrounding the tracked object area is displayed in a superimposed manner on the captured image displayed on the screen of the monitor display 150.

Each of the imaging signal processing circuit 142, the imaging control circuit 143, the image processing circuit 152, the image compression/decompression circuit 153, the object tracking circuit 161, and the object area determination circuit 162 includes an integrated circuit (an application-specific integrated circuit (ASIC)) in which circuits for performing particular processes are assembled. Alternatively, the CPU 151 may perform processing according to a program read from a read-only memory (ROM) (not illustrated), thereby functioning also as some or all of these circuits.

<Structure of Image Sensor>

Figure 2A:
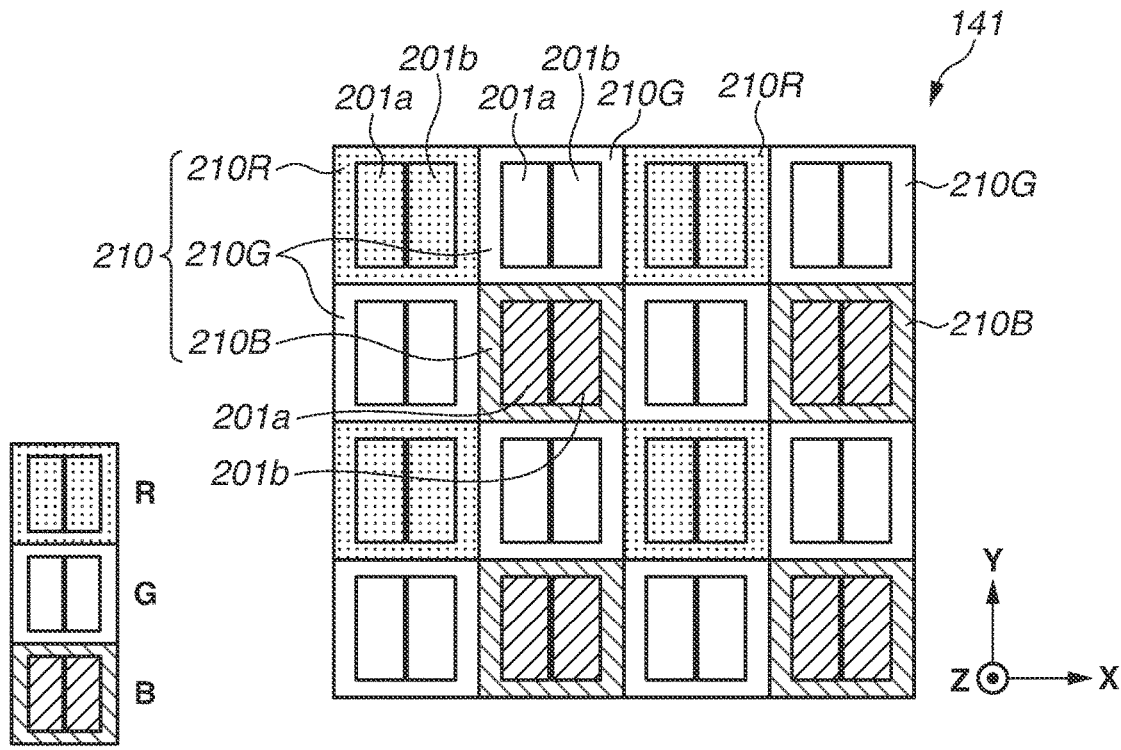
FIG. 2A is a diagram illustrating pixel arrangement of an image sensor according to one or more aspects of the present disclosure.
Figure 2B:
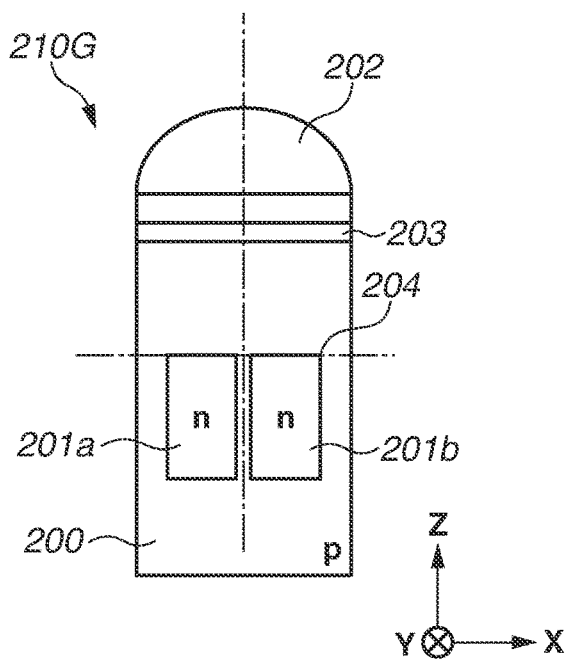
FIG. 2B is a cross-sectional view of a single pixel of the image sensor according to one or more aspects of the present disclosure.

With reference to FIGS. 2A and 2B, a description is given below of the general pixel structure of the image sensor 141 of the imaging apparatus 100 according to the present exemplary embodiment. FIG. 2A is a diagram illustrating the general pixel arrangement of the image sensor 141. FIG. 2B is a schematic cross-sectional view, along a ZX plane, of a single pixel 210G in the image sensor 141.

FIG. 2A illustrates the general pixel arrangement of the image sensor 141, which is a two-dimensional complementary metal-oxide-semiconductor (CMOS) sensor, for example. In the example of FIG. 2A, a pixel range of 4 rows×4 columns is illustrated. As illustrated in FIG. 2A, the image sensor 141 has a pixel arrangement structure corresponding to the so-called Bayer arrangement, and the color and the luminance of a single pixel 210 are determined based on a set of four pixels, namely a single pixel 210R, two pixels 210G, and a single pixel 210B, which are adjacent to each other. In the pixel 210 including the set of four pixels, the two pixels 210G, which are arranged in a diagonal direction, are pixels corresponding to the spectral sensitivity of green (G), the pixel 210R is a pixel corresponding to the spectral sensitivity of red (R), and the pixel 210B is a pixel corresponding to the spectral sensitivity of blue (B). Further, each of the pixels 210R, 210G, and 210B includes two sub-pixels 201*a* and 201*b* for pupil division. The sub-pixel 201*a* is a first photoelectric conversion element for receiving a light beam passing through a first pupil area of an imaging optical system (the lens unit 101), and a sub-pixel 201*b* is a second photoelectric conversion element for receiving a light beam passing through a second pupil area of the imaging optical system. Signals obtained from the two sub-pixels 201*a* and 201*b* are signals of a single pixel in the parallax images of the A-image and the B-image and can be used as signals of parallax pixels for use in focus detection. Further, a signal obtained by adding together the signals of the two sub-pixels 201*a* and 201*b* is a signal of a single pixel in the input image of the A+B image and is used as a signal of a pixel for imaging.

In FIG. 2A, the horizontal direction is an X-axis as a coordinate axis, and the vertical direction is a Y-axis as a coordinate axis. The X-axis and the Y-axis are axes parallel to the plane of the paper, and a two-dimensional XY plane including the X-axis and the Y-axis is a plane parallel to the plane of the paper. Further, in FIG. 2A, a Z-axis as a coordinate axis is an axis perpendicular to the plane of the paper. In this example, the sub-pixels 201*a* and 201*b* are placed to be arranged in the X-axis direction.

Further, FIG. 2B illustrates a cross-sectional view, along a ZX plane, of, as an example, one of the pixels 210G among the pixels 210R, 210G, and 210B illustrated in FIG. 2A. The pixels 210R and 210B have configurations similar to that of the pixel 210G, and therefore are not illustrated in FIG. 2B. In FIG. 2B, the horizontal direction is an X-axis direction, and the vertical direction is a Z-axis direction. The Z-axis and the X-axis are axes parallel to the plane of the paper, and a two-dimensional ZX plane including the Z-axis and the X-axis is a plane parallel to the plane of the paper. Further, in FIG. 2B, a Y-axis is an axis perpendicular to the plane of the paper.

The pixel 210G includes a photodiode including an n-type semiconductor layer (the sub-pixels 201*a* and 201*b*) and a p-type semiconductor layer 200. Further, a microlens 202 is disposed at a position a predetermined distance away in the Z-axis direction from a light-receiving surface 204 of the sub-pixels 201*a* and 201*b*. The microlens 202 is formed on a color filter 203. In the case of the pixel 210G in FIG. 2B, the color filter 203 is a filter having the spectral characteristics of green (G). In the case of the pixel 210R, the color filter 203 is a filter having the spectral characteristics of red (R). In the case of the pixel 210B, the color filter 203 is a filter having the spectral characteristics of blue (B).

As illustrated in FIGS. 2A and 2B, the sub-pixels 201*a* and 201*b* for pupil division are provided in all the pixels 210R, 210G, and 210B of the image sensor 141. The sub-pixels 201*a* and 201*b* can be used as pixels for both focus detection and imaging. The present exemplary embodiment, however, is not limited to this. Alternatively, the configuration may be such that pixels for focus detection that enable pupil division are provided in some of all the pixels.

<Object Determination Process>

Figure 3:
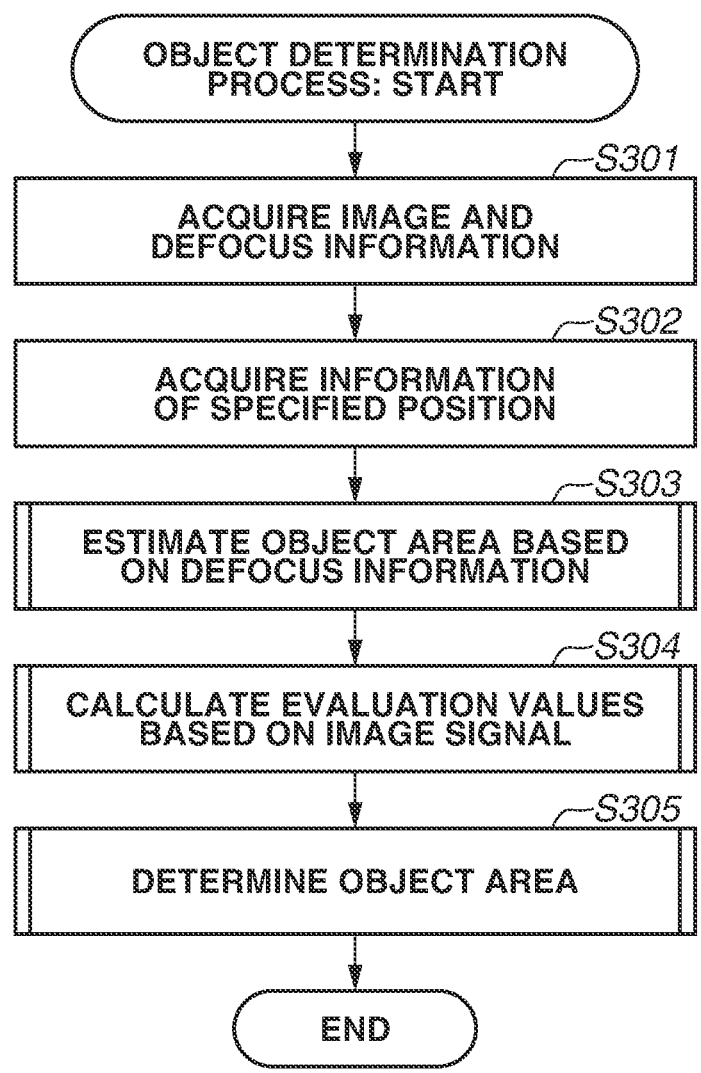
FIG. 3 is a flowchart of an entire flow of an object determination process according to one or more aspects of the present disclosure.

With reference to FIG. 3, a description is given of the entire flow of an object determination process performed by the imaging apparatus 100 according to the present exemplary embodiment. Processes in a flowchart in FIG. 3 may be achieved by, for example, the CPU 151 executing a program according to the present exemplary embodiment. The processing of the flowchart in FIG. 3 starts when, for example, in the state where the imaging apparatus 100 captures an image, for example, the user performs through the operation switch 156 the operation of giving an instruction to start object tracking.

If an instruction to start object tracking is input by the user, then first, in step S301, the CPU 151 causes the object area determination circuit 162 to acquire the input image data of the A+B image and the defocus information stored in the RAM 154. After step S301, the processing proceeds to step S302.

In step S302, when the user performs through the operation switch 156 the operation of specifying the position of a desired object on, for example, a through image on the monitor display 150, the CPU 151 acquires information of the specified position of the object. In the present exemplary embodiment, the position specifying operation performed by the user is, for example, a position specifying operation in which the user touches the position of a desired object on an image displayed on the screen of the monitor display 150. The CPU 151 sends to the object area determination circuit 162 the information of the specified position input by the position specifying operation performed by the user. After step S302, the processing of the imaging apparatus 100 proceeds to the process of step S303, which is performed by the object area determination circuit 162.

In step S303, based on the input image data of the A+B image, the defocus information, and the specified position information, the object area determination circuit 162 obtains an area estimated as an object area (an estimated area) from the input image of the A+B image. The details of the process of step S303 will be described below. After step S303, the processing proceeds to step S304.

In step S304, the object area determination circuit 162 sets a plurality of evaluation areas different in center position and size from each other for the input image data of the A+B image and calculates area evaluation values from the respective evaluation areas. The details of the process of step S304 will be described below. After step S304, the processing proceeds to step S305.

In step S305, the object area determination circuit 162 determines the object area from the input image of the A+B image using the estimated area obtained in step S303 and the evaluation areas and the area evaluation values calculated in step S304. The details of the process of step S305 will be described below. If the object area is determined in step S305, the processing of the flowchart in FIG. 3 ends.

<Object Area Estimation Process>

Figure 5A:
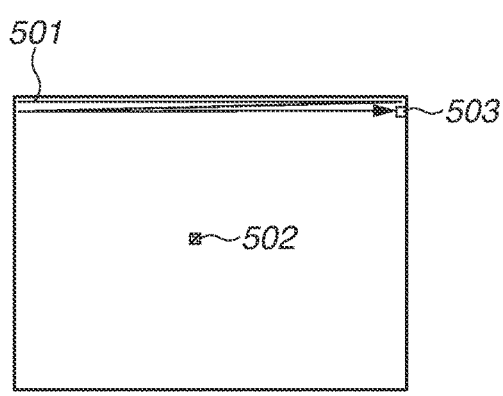
FIG. 5A is a diagram illustrating input image data of an A+B image according to one or more aspects of the present disclosure.
Figure 5B:
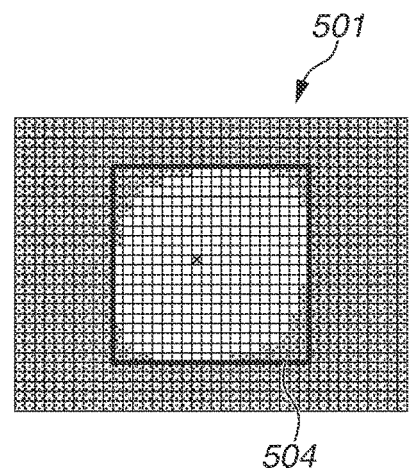
FIG. 5B is a diagram illustrating examples of evaluation values corresponding to pixels according to one or more aspects of the present disclosure.

With reference to FIGS. 4, 5A, and 5B, an object area estimation process in step S303 in FIG. 3 is described. FIG. 4 is a detailed flowchart of the object area estimation process in step S303 in FIG. 3. FIG. 5A is a diagram illustrating the input image data (an input image 501) of the A+B image. FIG. 5B is a diagram illustrating examples of evaluation values (hereinbelow referred to as "pixel evaluation values") corresponding to pixels (hereinbelow referred to as "evaluation pixels") represented by small rectangles in a grid. In the present exemplary embodiment, as the pixel evaluation value of each evaluation pixel, the defocus information at the position of the evaluation pixel is used.

In the flowchart in FIG. 4, in step S401, the object area determination circuit 162 refers to the defocus information (the defocus value) of a pixel corresponding to the specified position acquired in step S302 in FIG. 3. In the example of FIG. 5A, a pixel 502 is the pixel at the specified position. After step S401, the processing proceeds to step S402.

In step S402, the object area determination circuit 162 determines an evaluation pixel from the input image of the A+B image. Specifically, from among all the pixels of the input image of the A+B image 501 illustrated in FIG. 5A, the object area determination circuit 162 determines, as an evaluation pixel 503, each of pixels sequentially selected by a so-called raster process as indicated by an arrow. After step S402, the processing proceeds to step S403.

In step S403, the object area determination circuit 162 compares the defocus value corresponding to the pixel 502 at the specified position with the defocus value corresponding to the evaluation pixel (e.g., the pixel 503), thereby determining whether the difference between the defocus values is small. In the present exemplary embodiment, the determination of whether the difference between the defocus values is small is made based on, for example, whether the difference is in a predetermined threshold range determined in advance. As the threshold range for the difference between the defocus values at this time, for example, $\pm 1F\delta$ is used. $F\delta$ is the depth of focus, F is the stop value, and $\delta$ is the diameter of a permissible circle of confusion. More specifically, the object area determination circuit 162 sets the defocus value at the position specified as the object to a reference value OFS and determines whether the defocus value of the evaluation pixel is in the range of $+1F\delta$ to $-1F\delta$ with respect to the reference value ($0F\delta$). An arithmetic symbol "+" indicates that the distance from the camera is smaller than the distance from the position specified as the object. An arithmetic symbol "−" indicates that the distance from the camera is greater than the distance from the position specified as the object. In the example of FIG. 5B, pixels where the difference between the defocus values is in the threshold range (within $\pm 1F\delta$) are represented in white. Pixels where the difference between the defocus values is outside the threshold range are represented in gray (a fine dot pattern). After step S403, the processing proceeds to step S404.

In step S404, the object area determination circuit 162 determines whether there is an evaluation pixel that has not yet been evaluated. If there is an evaluation pixel that has not yet been evaluated (YES in step S404), the processing returns to step S402. Then, the object area determination circuit 162 repeats the series of processes of steps S402 to S404. If an evaluation pixel that has not yet been evaluated is not present (NO in step S404), the processing proceeds to step S405.

In step S405, the object area determination circuit 162 determines, as an area estimated as the object area (an estimated area), an area containing the pixels where the difference between the defocus value of the pixel 502 at the specified position and the defocus value of each evaluation pixel is determined as being in the threshold range in step S403. In the example of FIG. 5B, a rectangular area 504 including the evaluation pixels where the difference between the defocus values is in the threshold range is the estimated area. At this time, in the object area, the difference between the defocus value of the pixel at the specified position and the defocus value of each evaluation pixel is considered to be small. Thus, in the present exemplary embodiment, in a case where the difference between the defocus values is small (is in the threshold range), a rectangular area containing the pixel at the specified position and the evaluation pixels at this time is determined as the estimated area. After step S405, the processing of the flowchart in FIG. 4 ends.

<Evaluation Value Calculation Process>

Figure 7:
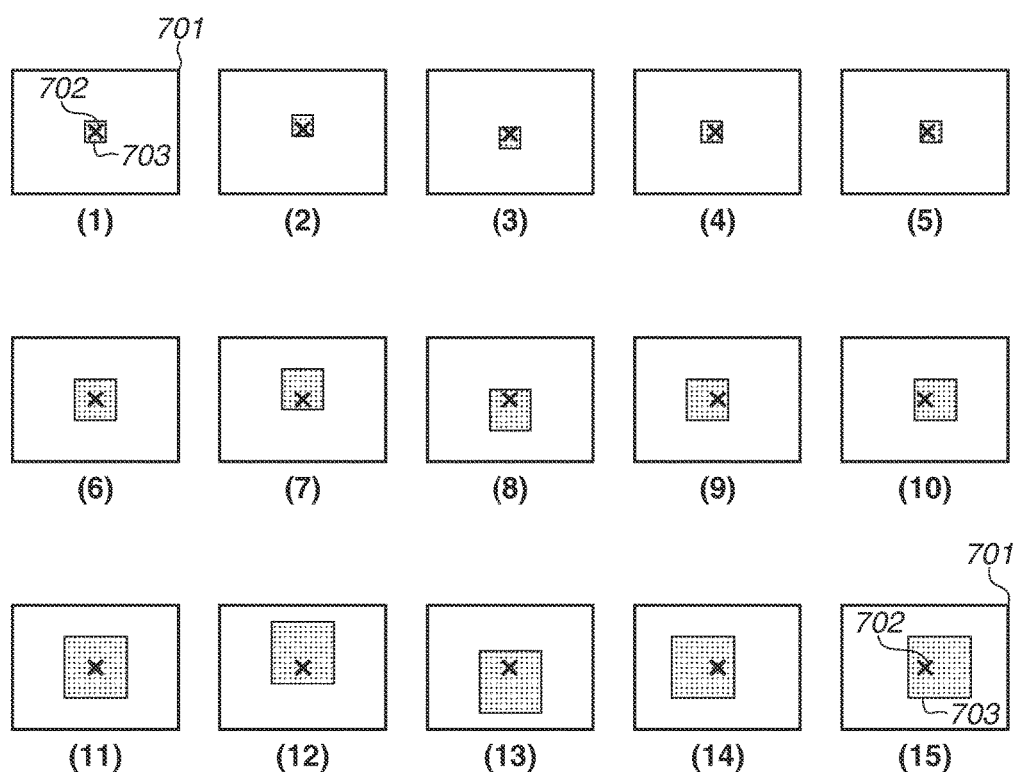
FIG. 7 is a diagram illustrating an evaluation area according to one or more aspects of the present disclosure.
Figure 8:
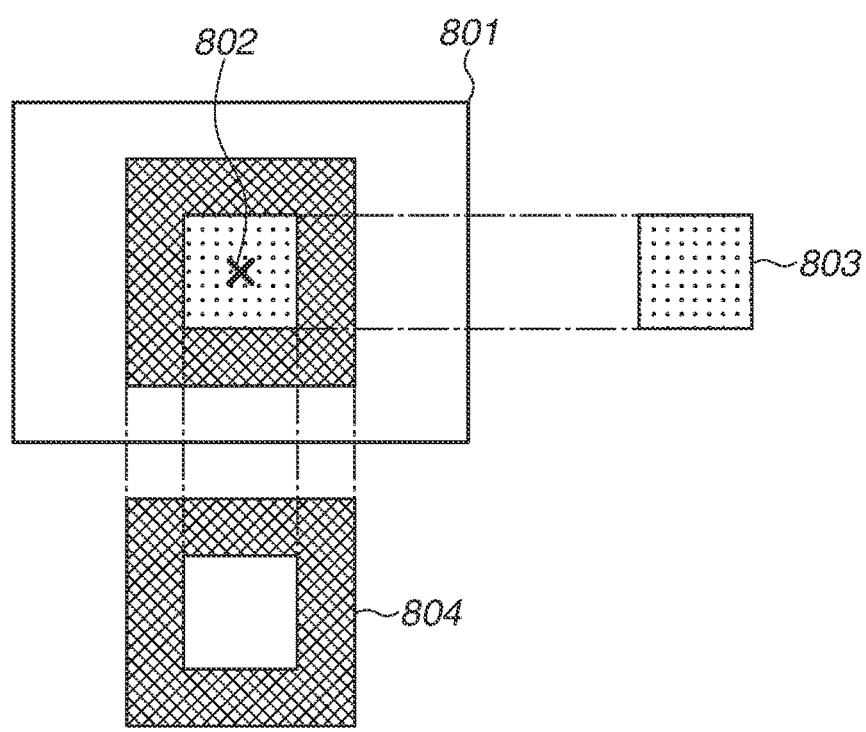
FIG. 8 is a diagram illustrating a background area according to one or more aspects of the present disclosure.

With reference to FIGS. 6, 7, and 8, a description is given of an area evaluation value calculation process on evaluation areas based on image signals in step S304 in FIG. 3. FIG. 6 is a detailed flowchart of the area evaluation value calculation process in step S304 in FIG. 3. In FIG. 7, diagrams (1) to (15) each illustrate examples of a specified position 702 and an evaluation area candidate 703 in an input image 701. In diagrams (1) to (15) in FIG. 7, to simplify the illustration, the reference numeral "701" of the input image, the reference numeral "702" of the specified position, and the reference numeral "703" of the evaluation area candidate are assigned in diagrams (1) and (15) of FIG. 7 and omitted in diagrams (2) to (14). FIG. 8 is a diagram illustrating examples of a specified position 802, an evaluation area 803, and a background area 804 in an input image 801.

First, in the flowchart in FIG. 6, in step S601, the object area determination circuit 162 determines, from among a plurality of evaluation area candidates, evaluation areas to be evaluated based on image signals. The processes of steps S601 to S604 are performed on a plurality of evaluation area candidates.

At this time, the plurality of evaluation area candidates 703 are areas different in center position and size from each other, for example, as illustrated in FIG. 7. The sizes of the plurality of evaluation area candidates 703 are calculated as values obtained by multiplying a predetermined size value determined in advance by n. As an example, the sizes of the plurality of evaluation area candidates 703 are represented by the number of pixels such as 16 pixels, 32 pixels, or 64 pixels. For example, if the size of an evaluation area candidate 703 is 16 pixels, the evaluation area candidate 703 is an area of 16×16 pixels. The center position of each evaluation area candidate 703 is determined as a position shifted by a predetermined value in any one of up, down, left, and right directions of the image, using the specified position 702 as a reference. The amount of shifting from the specified position 702 as a reference is determined by a proportion to the size of the evaluation area candidate 703. For example, the amount of shifting from the specified position 702 as a reference is set to an amount corresponding to ¼ of the size of the evaluation area candidate 703. Thus, the center position of each evaluation area candidate 703 is determined as a position shifted by an amount corresponding to ¼ of the size of the evaluation area candidate 703 from the specified position 702 as a reference. However, in a case where the center position of an evaluation area candidate 703 is located outside the input image 701, the object area determination circuit 162 does not determine the evaluation area candidate 703 as an evaluation area.

As described above, the object area determination circuit 162 determines as evaluation areas the plurality of evaluation area candidates 703 illustrated in FIG. 7 which are different in center position or size from each other and of which the center positions are not located outside the input image 701. If the center position of a determined evaluation area is not located outside the input image 701, but a part of the evaluation area is located outside the input image 701, the object area determination circuit 162 performs a clipping process so that the evaluation area is located within the input image 701. After step S601, the processing proceeds to step S602.

In step S602, the object area determination circuit 162 determines a background area for each of the plurality of evaluation areas determined in step S601. In the example of FIG. 8, the center position of the background area 804 is the same as that of the evaluation area 803. In the example of FIG. 8, the peripheral size of the background area 804 is a size obtained by adding a predetermined value to the size of the evaluation area 803. The background area 804 is a doughnut-shaped area obtained by excluding the evaluation area 803. The predetermined value added to the size of the evaluation area 803 is determined as the value of a proportion according to the size of the input image 801. In the present exemplary embodiment, the predetermined value is a value corresponding to, for example, 10% of the horizontal size (the number of pixels in the horizontal direction) of the input image 801. If a part of the background area 804 is located outside the input image 801, the object area determination circuit 162 performs a clipping process so that the background area 804 is located within the input image 801. After step S602, the processing proceeds to step S603.

In step S603, the object area determination circuit 162 calculates the degree of difference between an image signal corresponding to each of the evaluation areas determined in step S601 and an image signal corresponding to the background area determined in step S602, as an area evaluation value for the evaluation area. In the present exemplary embodiment, the object area determination circuit 162 obtains the degree of difference in hue information, the degree of difference in saturation information, and the degree of difference in luminance information between the image signals of the evaluation area and the background area and adds the degrees of difference together to obtain the degree of difference (the area evaluation value) for the evaluation area. The object area determination circuit 162 calculates a degree of difference D for the evaluation area by the following formula (1).

$$d_H = \sum_{i=0}^{m} |p_{Hi} - q_{Hi}|$$

$$d_S = \sum_{i=0}^{m} |p_{Si} - q_{Si}|$$

$$d_V = \sum_{i=0}^{m} |p_{Vi} - q_{Vi}|$$

$$D = d_H + d_S + d_V$$

(1)

In formula (1), $d_H$ represents a degree of difference calculated from hue information of the evaluation area and hue information of the background area, $p_{Hi}$ represents the number of pixels of which hue information is i in the evaluation area, and $q_{Hi}$ represents the number of pixels of which hue information is i in the background area. Further, $d_S$ represents a degree of difference calculated from saturation information of the evaluation area and saturation information of the background area, $p_{Si}$ represents the number of pixels of which saturation information is i in the evaluation area, and $q_{Si}$ represents the number of pixels of which saturation information is i in the background area. Further, $d_V$ represents a degree of difference calculated from luminance information of the evaluation area and luminance information of the background area, $p_{Vi}$ represents the number of pixels of which luminance information is i in the evaluation area, and $q_{Vi}$ represents the number of pixels of which luminance information is i in the background area. Further, m is a maximum value that can be taken by the hue information, the saturation information, and the luminance information.

The degree of difference between image signals of the object area and the background area is considered to be great (high). Thus, it is considered that if the degree of difference between the evaluation area and the background area is great, it is highly likely that the evaluation area is the object area. Thus, in the present exemplary embodiment, as described above, the degree of difference between the evaluation area and the background area is obtained as an area evaluation value for determining whether the evaluation area is the object area. After step S603, the processing proceeds to step S604.

In step S604, the object area determination circuit 162 determines whether there is an evaluation area candidate that has not yet been processed among the plurality of evaluation area candidates. If there is an evaluation area candidate that has not yet been processed (YES in step S604), the processing returns to step S601. Then, the object area determination circuit 162 repeats the series of processes of steps S601 to S604. If there is no evaluation area candidate that has not yet been processed (NO in step S604), the processing of the flowchart in FIG. 6 ends.

<Object Area Determination Process>

Figure 9:
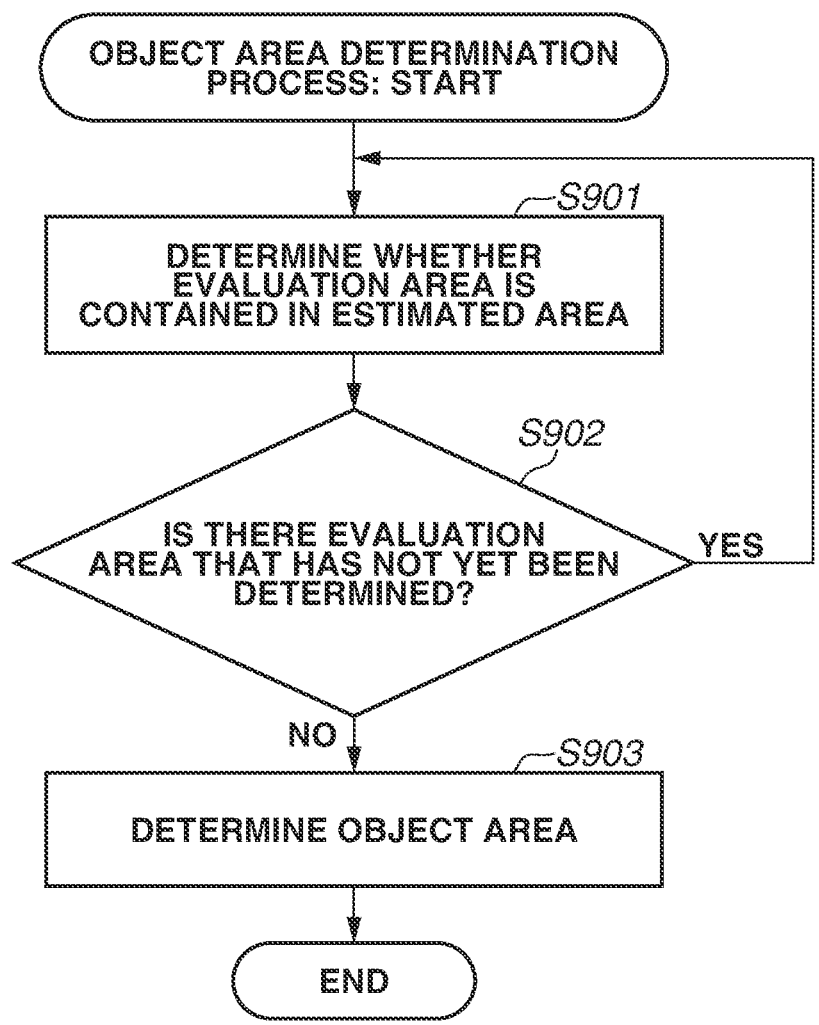
FIG. 9 is a detailed flowchart of an object area determination process according to one or more aspects of the present disclosure.
Figure 10A:
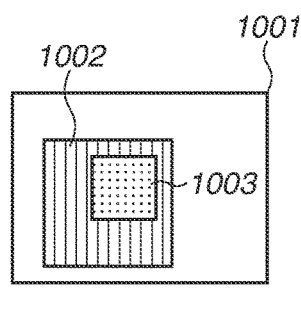
FIG. 10A is a diagram illustrating an example of positions of an evaluation area and an estimated area.
Figure 10B:
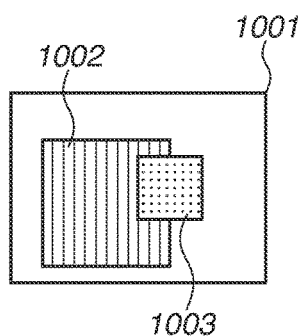
FIG. 10B is a diagram illustrating another example of the positions of the evaluation area and the estimated area.
Figure 10C:
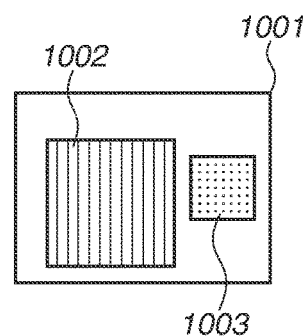
FIG. 10C is a diagram illustrating yet another example of the positions of the evaluation area and the estimated area.

With reference to FIGS. 9 and 10A to 10C, the details of an object area determination process in step S305 in FIG. 3 are described. FIG. 9 is a detailed flowchart of the object area determination process in step S305 in FIG. 3. FIGS. 10A to 10C are diagrams illustrating examples of an input image 1001, an estimated area 1002, and an evaluation area 1003.

In the flowchart in FIG. 9, in step S901, the object area determination circuit 162 determines whether each of the plurality of evaluation areas obtained in the flowchart in FIG. 6 is contained in the estimated area obtained in the flowchart in FIG. 4. In the example of FIG. 10A, all the pixels of the evaluation area 1003 are located within the estimated area 1002. Thus, the object area determination circuit 162 determines that the evaluation area 1003 is contained in the estimated area 1002. In the example of FIG. 10B, some of the pixels of the evaluation area 1003 are located outside the estimated area 1002. Thus, the object area determination circuit 162 determines that the evaluation area 1003 is not contained in the estimated area 1002. Similarly, in the example of FIG. 10C, all the pixels of the evaluation area 1003 are located outside the estimated area 1002. Thus, the object area determination circuit 162 determines that the evaluation area 1003 is not contained in the estimated area 1002. After step S901, the processing proceeds to step S902.

In step S902, the object area determination circuit 162 determines whether there is an evaluation area that has not yet been determined in step S901. If it is determined that there is an evaluation area that has not yet been determined (YES in step S902), the processing returns to step S901. Then, the object area determination circuit 162 repeats the series of processes of steps S901 and S902. If it is determined that there is no evaluation area that has not yet been determined (NO in step S902), the processing proceeds to step S903.

In step S903, from among the evaluation areas determined as being contained in the estimated area in step S901, the object area determination circuit 162 selects an evaluation area having the highest likelihood of being the object area based on the area evaluation value obtained in step S603 in FIG. 6 and determines the evaluation area as the object area. Specifically, using the area evaluation value, which is the degree of difference, the object area determination circuit 162 obtains an evaluation area having the highest likelihood of being the object area. That is, the object area determination circuit 162 determines as the object area an evaluation area where the degree of difference is the highest, i.e., an evaluation area where the degree of difference between the evaluation area and the background area is the greatest, among the evaluation areas determined as being contained in the estimated area. If no evaluation area is determined as being contained in the estimated area in step S901, an evaluation area where the degree of difference between the evaluation area and the background area is the greatest among the plurality of evaluation areas obtained in the flowchart in FIG. 6 may be determined as the object area. After step S903, the processing of the flowchart in FIG. 9 ends.

As described above, the imaging apparatus 100 according to the first exemplary embodiment determines an estimated area based on the defocus values of pixels at and around a specified position and also obtains, from each of a plurality of evaluation areas, an area evaluation value based on an image signal around the specified position. Then, using evaluation areas contained in the estimated area among the plurality of evaluation areas, the imaging apparatus 100 determines as an object area an evaluation area where the degree of difference (the area evaluation value) is the highest among the used evaluation areas. Consequently, with the imaging apparatus 100 according to the first exemplary embodiment, even in a case where image signals of an object area and a background area resemble each other, it is possible to determine the object area located near a specified position with high accuracy.

An imaging apparatus 100 according to a second exemplary embodiment is described below. The configuration of the imaging apparatus 100 according to the second exemplary embodiment is similar to that in FIG. 1, and therefore is not described here. In an object determination process according to the second exemplary embodiment, processes different from those in the object determination process according to the first exemplary embodiment are described below. The second exemplary embodiment is different from the example of the first exemplary embodiment in the object area estimation process based on the defocus information (the defocus values) in step S303 in FIG. 3 and the object area determination process in step S305 in FIG. 3.

Figure 11:
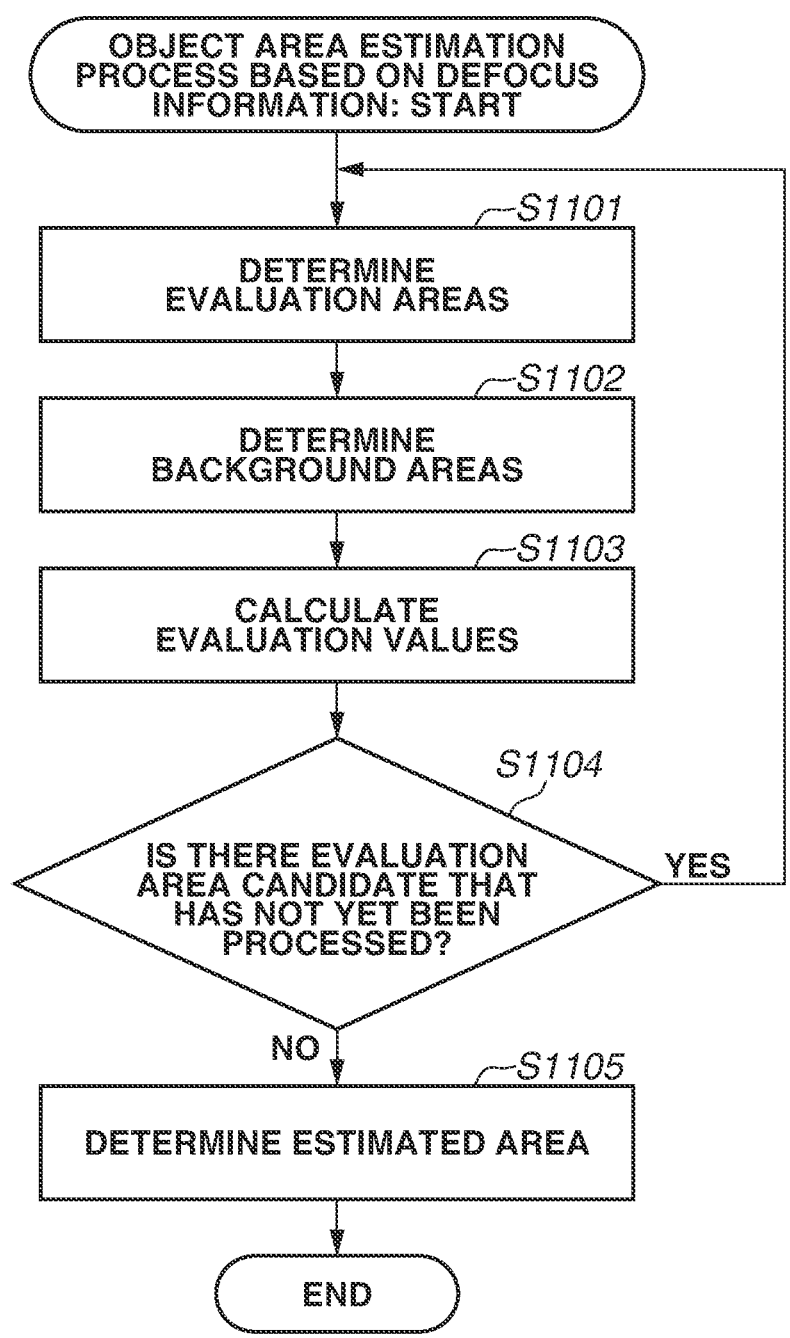
FIG. 11 is a flowchart of an object area estimation process according to one or more aspects of the present disclosure.

Object Area Estimation Process Based on Defocus Information in Second Exemplary Embodiment FIG. 11 is a flowchart illustrating the flow of an object area estimation process using the defocus values (the defocus information) in step S303 in FIG. 3 according to the second exemplary embodiment.

In the flowchart in FIG. 11, in step S1101, the object area determination circuit 162 determines, from among a plurality of evaluation area candidates as illustrated in FIG. 7, evaluation areas to be evaluated using defocus values as an area evaluation value. The process of determining evaluation areas to be used from among the plurality of evaluation area candidates is similar to the process of step S601 in FIG. 6, and therefore is not described here. After step S1101, the processing proceeds to step S1102.

In step S1102, the object area determination circuit 162 determines a background area for each of the evaluation areas by a process similar to that of step S602 in FIG. 6. After step S1102, the processing proceeds to step S1103.

In step S1103, the object area determination circuit 162 calculates the degree of difference between a defocus value corresponding to each of the pixels of the evaluation area and a defocus value corresponding to each of the pixels of the background area, as an area evaluation value for the evaluation area. That is, in the first exemplary embodiment, the degree of difference between the image signals of the evaluation area and the background area is set as the area evaluation value. In the second exemplary embodiment, the degree of difference between the defocus values of the evaluation area and the background area is set as the area evaluation value. In the second exemplary embodiment, the object area determination circuit 162 calculates an area evaluation value $d_D$ using the defocus values by the following formula (2).

$$d_D = \sum_{i=D_{min}}^{D_{max}} |p_{Di} - q_{Di}| \qquad (2)$$

In formula (2), $p_{Di}$ represents the number of pixels of which the defocus value is i among the pixels of the evaluation area, and $q_{Di}$ represents the number of pixels of which the defocus value is i among the pixels of the background area. Further, $D_{max}$ is a maximum value that can be taken by the defocus value, and Drain is a minimum value that can be taken by the defocus value. After step S1103, the processing proceeds to step S1104. The process of step S1104 is similar to the process of step S604 in FIG. 6. If it is determined in step S1104 that there is no evaluation area candidate that has not yet been processed (NO in step S1104), the processing proceeds to step S1105.

In step S1105, from among the evaluation areas determined in step S1101, the object area determination circuit 162 determines an evaluation area having the highest likelihood of being the object area as an estimated area based on the area evaluation value obtained in step S1103. In the second exemplary embodiment, the degree of difference between the defocus values is set as the area evaluation value. Thus, the object area determination circuit 162 determines as the estimated area an evaluation area where the degree of difference between the defocus values is the greatest (highest). After step S1105, the processing of the flowchart in FIG. 11 ends.

Object Area Determination Process in Second Exemplary Embodiment

Figure 12:
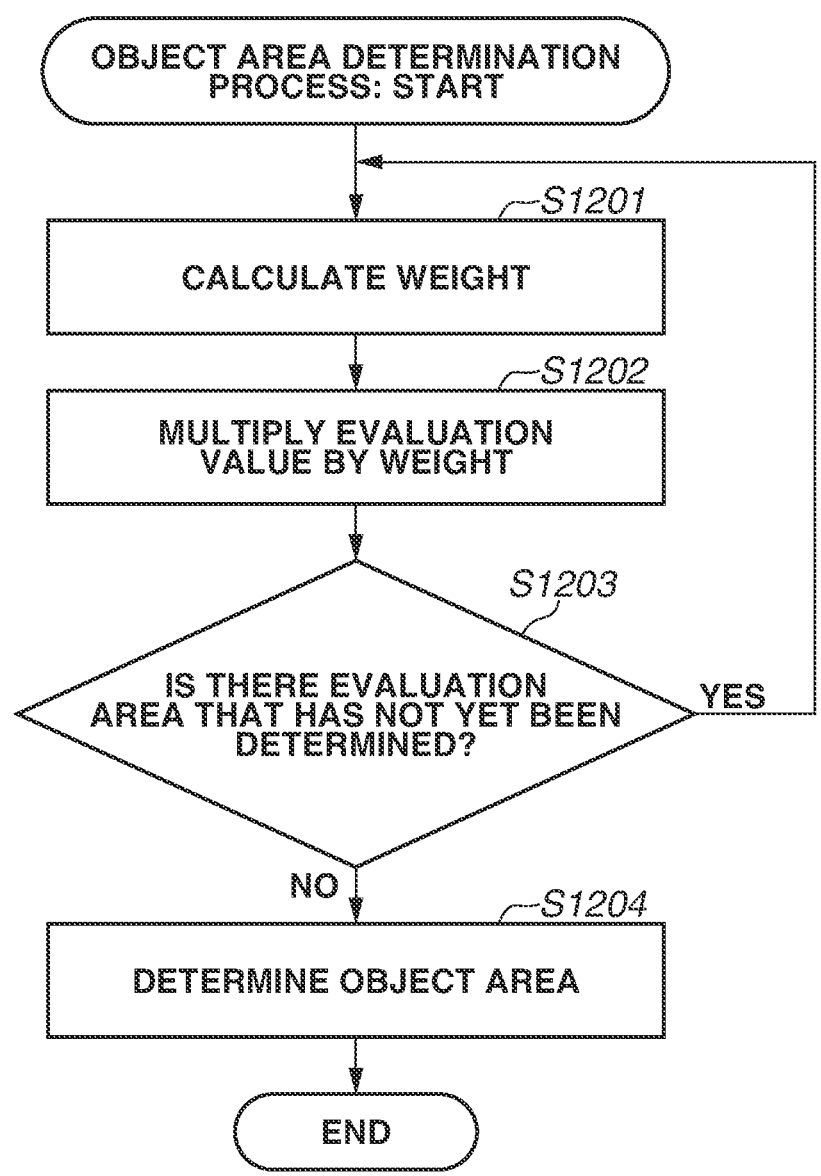
FIG. 12 is a detailed flowchart of an object area determination process according to one or more aspects of the present disclosure.

With reference to FIGS. 10A to 10C and FIG. 12, the detailed flow of an object area determination according to the second exemplary embodiment is described. FIG. 12 is a detailed flowchart of an object area determination process in step S305 in FIG. 3 according to the second exemplary embodiment.

In the flowchart in FIG. 12, in step S1201, the object area determination circuit 162 calculates a weight value for each of the plurality of evaluation areas in the second exemplary embodiment. The object area determination circuit 162 calculates a weight value W by the following formula (3).

$$W = N_{P0}/N_{P1} \tag{3}$$

In formula (3), $N_{P0}$ represents the number of pixels of the evaluation area contained in the estimated area, and $N_{P1}$ represents the number of pixels of all the evaluation areas.

In the second exemplary embodiment, in the example of FIG. 10A, all the pixels of the evaluation area 1003 are located within the estimated area 1002. Thus, a value of 1.0 is calculated as the weight value M by formula (3). In the example of FIG. 10B, for example, 50% of pixels of the evaluation area 1003 are located within the estimated area 1002. Thus, a value of 0.5 is calculated as the weight value M by the formula (3). In the example of FIG. 10C, all the pixels of the evaluation area 1003 are not located within the estimated area 1002. Thus, a value of 0 is calculated as the weight value M by the formula (3). After step S1201, the processing proceeds to step S1202.

In step S1202, the object area determination circuit 162 multiplies the area evaluation value obtained in step S304 in FIG. 3 by the weight value obtained in step S1201, thereby calculating a weighted evaluation value. After step S1202, the processing proceeds to step S1203.

In step S1203, the object area determination circuit 162 determines whether there is an evaluation area that has not yet been processed. If there is an evaluation area that has not yet been processed (YES in step S1203), the processing returns to step S1201. Then, the object area determination circuit 162 repeats the series of processes of steps S1201 to S1203. If there is no evaluation area that has not yet been processed (NO in step S1203), the processing proceeds to step S1204.

In step S1204, using the weighted evaluation value calculated in step S1202, the object area determination circuit 162 determines an evaluation area having the highest likelihood of being the object area as the object area by a process similar to that of step S903 in FIG. 9. After step S1204, the processing of the flowchart in FIG. 12 ends.

As described above, the imaging apparatus 100 according to the second exemplary embodiment weights an area evaluation value according to the number of pixels of an evaluation area contained in an estimated area. That is, in the second exemplary embodiment, weight is changed between evaluation areas used for determination among a plurality of evaluation areas. As described above, according to the second exemplary embodiment, also the evaluation areas used for determination among the plurality of evaluation areas are further determined according to the number of pixels of each evaluation area contained in the estimated area. With the imaging apparatus 100 according to the second exemplary embodiment, even in a case where image signals of an object area and a background area resemble each other, it is possible to determine the object area located near a specified position with high accuracy.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims is to be accorded the broadest interpretation so as to encompass all such modifications and equivalent structures and functions.

This application claims the benefit of Japanese Patent Application No. 2016-120794, filed Jun. 17, 2016, which is hereby incorporated by reference herein in its entirety.

What is claimed is:

1. An information processing apparatus comprising:
   a determination circuit configured to acquire defocus values at positions in a captured image, acquire a position specified as an object in the captured image, determine, based on a difference between a defocus value at each of the positions and a defocus value at the specified position, an estimated area of the object specified in the captured image, and determine an object area from the captured image based on an evaluation value calculated from each of a plurality of evaluation areas set for the specified position,
   wherein the determination circuit uses an evaluation area contained in the estimated area.

2. The information processing apparatus according to claim 1, wherein the determination circuit gives more weight to the evaluation values of the evaluation areas contained in the estimated area than to the evaluation value of an evaluation area not contained in the estimated area and then determines the object area.

3. The information processing apparatus according to claim 1, wherein the determination circuit determines as the object area an evaluation area selected based on the evaluation value from among the evaluation areas contained in the estimated area.

4. The information processing apparatus according to claim 1, wherein the determination circuit sets one or more evaluation areas, calculates evaluation values of pixels of each of the evaluation areas, and determines the object area from among the one or more evaluation areas based on the evaluation values of the pixels.

5. The information processing apparatus according to claim 4, wherein the determination circuit sets, for the specified position, one or more evaluation areas different in at least position or size.

6. The information processing apparatus according to claim 5, wherein the determination circuit determines an amount of shifting a center position of each of the evaluation areas based on a size of the evaluation area.

7. The information processing apparatus according to claim 4, wherein for each of the evaluation areas, the determination circuit calculates, as the evaluation value of each of the pixels, a degree of difference between defocus information of each of the pixels of the evaluation area and defocus information of each of pixels around the evaluation area.

8. The information processing apparatus according to claim 1, wherein the determination circuit sets, near the specified position, one or more evaluation areas different in at least center position or size.

9. The information processing apparatus according to claim 8, wherein the determination circuit determines an amount of shifting a center position of each of the evaluation areas based on a size of the evaluation area.

10. The information processing apparatus according to claim 8, wherein for each of the evaluation areas, the determination circuit calculates, as the evaluation value of the evaluation area, a degree of difference between an image signal of the evaluation area and an image signal around the evaluation area, and determines the object area using the estimated area, the one or more evaluation areas, and the evaluation values of the respective evaluation areas.

11. The information processing apparatus according to claim 10, wherein, the greater the degree of difference, the greater the evaluation value.

12. The information processing apparatus according to claim 11, wherein the degree of difference is a degree of difference in at least any of hue, saturation, and luminance.

13. The information processing apparatus according to claim 1, where the position specified as the object is a position specified by performing an operation by a user.

14. The information processing apparatus according to claim 1, further comprising:
a tracking circuit configured to track the object area by performing matching processing using the object area determined by the determination circuit.

15. The information processing apparatus according to claim 14, further comprising:
a focus control circuit configured to bring the object area tracked by the tracking circuit into focus.

16. An imaging apparatus comprising:
an image sensor configured to generate an image signal of a captured image;
a control circuit configured to generate defocus information at positions of pixels in the captured image;
a determination circuit configured to acquire a position specified as an object in the captured image, determine, based on a difference between a defocus value at each of the positions and a defocus value at the specified position, an estimated area of the object specified in the captured image, and determine an object area from the captured image based on an evaluation value calculated from each of a plurality of evaluation areas set for the specified position,
wherein the determination circuit uses an evaluation area contained in the estimated area.

17. The imaging apparatus according to claim 16, wherein the determination circuit gives more weight to the evaluation values of the evaluation areas contained in the estimated area than to the evaluation value of an evaluation area not contained in the estimated area and then determines the object area.

18. The imaging apparatus according to claim 17, wherein the image sensor generates a first image and a second image that has parallax in relation to the first image, and wherein the control circuit generates the defocus information using the first image and the second image.

19. The imaging apparatus according to claim 18, wherein the captured image is generated by adding the first image and the second image together.

20. An information processing method comprising:
acquiring defocus values at positions in a captured image, acquiring a position specified as an object in the captured image, and determining, based on a difference between a defocus value at each of the positions and a defocus value at the specified position, an estimated area of the object specified in the captured image; and
determining an object area from the captured image based on an evaluation value calculated from each of a plurality of evaluation areas set for the specified position,
wherein an evaluation area contained in the estimated area is used.

21. A non-transitory computer-readable storage medium storing a program to be executed by an information processing apparatus, the program including executable instructions for achieving an information processing method, the method comprising:
acquiring defocus values at positions in a captured image, acquiring a position specified as an object in the captured image, and determining, based on a difference between a defocus value at each of the positions and a defocus value at the specified position, an estimated area of the object specified in the captured image; and
determining an object area from the captured image based on an evaluation value calculated from each of a plurality of evaluation areas set for the specified position,
wherein an evaluation area contained in the estimated area is used.

22. An information processing apparatus comprising:
a determination circuit configured to acquire defocus values at positions in a captured image, acquire a position specified as an object in the captured image, determine, based on a difference between a defocus value at each of the positions and a defocus value at the specified position, an estimated area of the object specified in the captured image, and determine an object area from the captured image based on an evaluation value calculated from each of a plurality of evaluation areas set for the specified position; and a tracking circuit configured to track the object area by performing matching processing using the object area determined by the determination circuit;

wherein the determination circuit sets, near the specified position, a plurality of evaluation areas different in at least center position or size, wherein weighting is performed for the evaluation value of each of the plurality of evaluation areas, and wherein, the larger the number of pixels included in the estimated area, the greater a value of the weighting, and wherein the object area is determined on a basis of the weighted evaluation values of the plurality of evaluation areas.

23. The information processing apparatus according to claim 22, wherein the position specified as the object is a position specified by performing an operation by a user.

24. The information processing apparatus according to claim 23, wherein for each of the evaluation areas, the determination circuit calculates, as the evaluation value of the evaluation area, a degree of difference between an image signal of the evaluation area and an image signal around the evaluation area.

25. The information processing apparatus according to claim 24, wherein, the greater the degree of difference, the greater the evaluation value.

26. The information processing apparatus according to claim 25, wherein the degree of difference is a degree of difference in at least any of hue, saturation, and luminance.

27. An information processing method comprising:
acquiring defocus values at positions in a captured image;
acquiring a position specified as an object in the captured image;
determining, based on a difference between a defocus value at each of the positions and a defocus value at the specified position, an estimated area of the object specified in the captured image;
setting, near the specified position, a plurality of evaluation areas different in at least center position or size;
calculating an evaluation value of each of the plurality of evaluation areas;
performing weighting for the evaluation value of each of the plurality of evaluation areas, and wherein, the larger the number of pixels included in the estimated area, the greater a value of the weighting; and
determining the object area on a basis of the weighted evaluation values of the plurality of evaluation areas.

28. A non-transitory computer-readable storage medium storing a program to be executed by an information processing apparatus, the program including executable instructions for achieving an information processing method, the method comprising:
acquiring defocus values at positions in a captured image;
acquiring a position specified as an object in the captured image;
determining, based on a difference between a defocus value at each of the positions and a defocus value at the specified position, an estimated area of the object specified in the captured image;
setting, near the specified position, a plurality of evaluation areas different in at least center position or size;
calculating an evaluation value of each of the plurality of evaluation areas;
performing weighting for the evaluation value of each of the plurality of evaluation areas, and wherein, the larger the number of pixels included in the estimated area, the greater a value of the weighting; and
determining the object area on a basis of the weighted evaluation values of the plurality of evaluation areas.

* * * * *